(12) United States Patent
Fredriksson

(10) Patent No.: US 10,414,312 B2
(45) Date of Patent: Sep. 17, 2019

(54) ADJUSTABLE HEADREST ASSEMBLY

(71) Applicant: Ford Global Technologies, LLC, Dearborn, MI (US)

(72) Inventor: Chris Fredriksson, Ontario (CA)

(73) Assignee: Ford Global Technologies, LLC, Dearborn, MI (US)

( * ) Notice: Subject to any disclaimer, the term of this patent is extended or adjusted under 35 U.S.C. 154(b) by 258 days.

(21) Appl. No.: 15/601,229

(22) Filed: May 22, 2017

(65) Prior Publication Data

US 2018/0334061 A1 Nov. 22, 2018

(51) Int. Cl.
| | |
|---|---|
| *B60N 2/80* | (2018.01) |
| *B60N 2/829* | (2018.01) |
| *B60N 2/865* | (2018.01) |
| *B60N 2/879* | (2018.01) |
| *B60N 2/853* | (2018.01) |
| *B60N 2/885* | (2018.01) |
| B60N 2/809 | (2018.01) |
| B60N 2/838 | (2018.01) |

(52) U.S. Cl.
CPC ............ *B60N 2/829* (2018.02); *B60N 2/853* (2018.02); *B60N 2/865* (2018.02); *B60N 2/879* (2018.02); *B60N 2/885* (2018.02); B60N 2/809 (2018.02); B60N 2/838 (2018.02)

(58) Field of Classification Search
CPC ......... B60N 2/80; B60N 2/806; B60N 2/809; B60N 2/829; B60N 2/838; B60N 2/853; B60N 2/865; B60N 2/879; B60N 2/885; B60N 2/894
See application file for complete search history.

(56) References Cited

U.S. PATENT DOCUMENTS

| | | | | |
|---|---|---|---|---|
| 4,720,146 A | * | 1/1988 | Mawbey | B60N 2/914 297/409 |
| 4,762,367 A | * | 8/1988 | Denton | B60N 2/865 297/409 |
| 7,871,129 B2 | | 1/2011 | Boes et al. | |
| 8,534,760 B2 | | 9/2013 | Kotz | |

(Continued)

FOREIGN PATENT DOCUMENTS

| | | | | |
|---|---|---|---|---|
| WO | WO-2014168583 A1 | * | 10/2014 | ............... B60N 2/80 |
| WO | WO-2017155561 A1 | * | 9/2017 | ........... B60N 2/7011 |

*Primary Examiner* — Ryan D Kwiecinski
(74) *Attorney, Agent, or Firm* — Vichit Chea; Price Heneveld LLP

(57) ABSTRACT

A headrest assembly includes upright supports that are partially disposed within a rear housing and interconnected to one another by a vertically adjustable guide bracket. A mounting plate is operably coupled to the guide bracket by a driveshaft of a first motor for driving horizontal movement of the mounting plate. A headrest bun is pivotally coupled to the mounting plate for rotating movement between upright and angled positions. A second motor is mounted to at least one of the upright supports and includes a vertical driveshaft coupled to the guide bracket for driving vertical movement of the guide bracket. The headrest bun includes first and second side bolsters that are pivotally coupled to a central support member between extended and retracted positions. The headrest assembly may further include an air moving device to provide ventilation or a heating feature to a user of the headrest assembly.

19 Claims, 16 Drawing Sheets

(56) References Cited

U.S. PATENT DOCUMENTS

| | | | |
|---|---|---|---|
| 8,657,378 B2 | 2/2014 | Kunert et al. | |
| 9,744,888 B1* | 8/2017 | Hall | B60N 2/06 |
| 9,987,958 B2* | 6/2018 | Kondrad | B60N 2/865 |
| 2015/0130248 A1* | 5/2015 | Line | B60N 2/865 |
| | | | 297/410 |
| 2017/0313217 A1* | 11/2017 | Line | B60N 2/865 |
| 2017/0313220 A1* | 11/2017 | Line | B60N 2/58 |
| 2017/0341547 A1* | 11/2017 | Tatewaki | B60N 2/865 |
| 2019/0061586 A1* | 2/2019 | Nakamura | B60N 2/885 |

* cited by examiner

ADJUSTABLE HEADREST ASSEMBLY

FIELD OF THE INVENTION

The present invention generally relates to a headrest assembly, and more particularly, to a modular headrest assembly that includes multiple adjustable features as well as a ventilation option.

BACKGROUND OF THE INVENTION

Headrest assemblies, for particular use in conjunction with vehicle seats, often include a number of adjustable features that may be powered or manually adjusted. Such headrest assemblies may be bulky and expensive in order to provide the adjustability necessary to meet the needs of a multitude of users. In the vehicle industry, various trim levels call for upgraded features, including headrest assemblies having enhanced comfort features. As such, a modular headrest assembly that can be used with a variety of trim levels within a vehicle is desired.

SUMMARY OF THE INVENTION

One aspect of the present invention includes a headrest assembly having a stationary rear housing. First and second motors are housed within an interior of the rear housing. A mounting plate is positioned outside of the stationary rear housing and operably coupled to the first and second motors for horizontal and vertical adjustment of the mounting plate. A headrest bun includes a central support member pivotally coupled to the mounting plate between upright and angled positions. First and second side bolsters are pivotally coupled to opposite ends of the central support member and are independently operable between extended and retracted positions.

Embodiments of the first aspect of the invention can include any one or a combination of the following features:
- first and second supports that are partially disposed within a rear housing and interconnected to one another by a vertically adjustable guide bracket;
- a mounting plate that is operably coupled to the guide bracket by a first motor for horizontal adjustment of the mounting plate;
- a headrest bun that is pivotally coupled to the mounting plate for movement between upright and angled positions;
- a second motor that is mounted to at least one of the upright supports and includes a vertical driveshaft coupled to the guide bracket for driving vertical movement of the guide bracket;
- first and second side bolsters disposed within the headrest assembly that are pivotally coupled to a central support member between extended and retracted positions; and
- an air moving device that is disposed within the headrest bun or rear housing.

Another aspect of the present invention includes a headrest assembly having a headrest bun which includes adjustable first and second side bolsters disposed on opposite ends of the headrest bun. A mounting plate pivotally supports the headrest bun between upright and tilt positions. First and second motors are disposed in a rear housing and operably coupled to the mounting plate for driving horizontal and vertical movement of the headrest bun. An air moving device is disposed within an interior of the headrest bun.

Yet, another aspect of the present invention includes a headrest assembly having a rear housing. A mounting plate is operably coupled to the rear housing and is vertically and horizontally adjustable relative to the rear housing. A headrest bun is pivotally coupled to the mounting plate between upright and angled positions. An air moving device is disposed within an interior of the headrest bun.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1A:
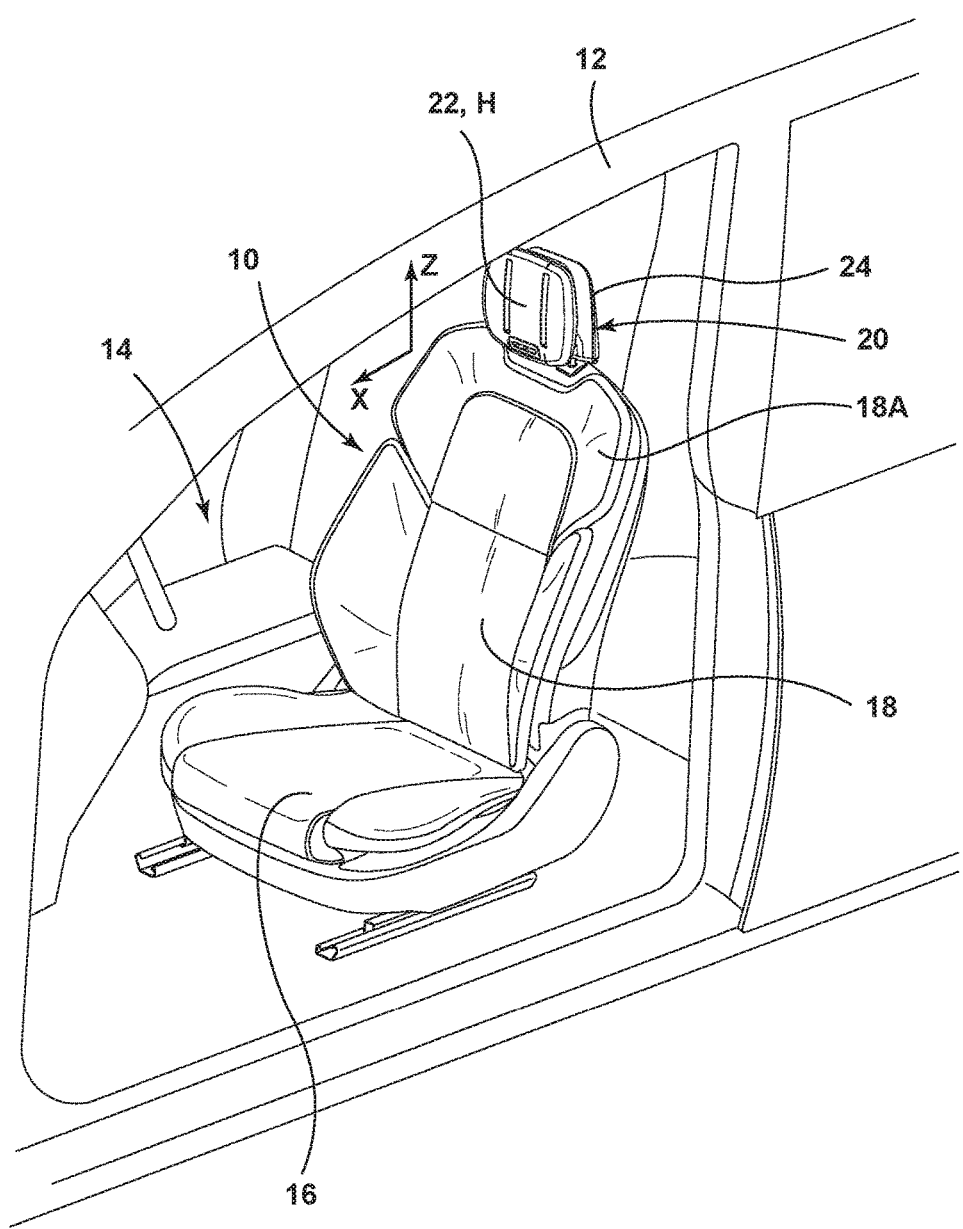
FIG. 1A is a top perspective view of a vehicle seat disposed within a vehicle interior having a headrest assembly according to one embodiment of the present invention.

For purposes of description herein, the terms "upper," "lower," "right," "left," "rear," "front," "vertical," "horizontal," and derivatives thereof shall relate to the invention as oriented in FIG. 1A. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1A, a vehicle seat 10 is shown disposed in a vehicle 12 within a vehicle interior 14. The vehicle seat 10 includes a seat portion 16 which is coupled to a seatback 18. The seatback 18 includes an upper portion 18A having a headrest assembly 20 removably mounted thereon. Being removably mounted to the vehicle seat 10, the headrest assembly 20 of the present concept is a modular assembly that can be used on various vehicle seats to accommodate specific trim levels of a particular vehicle build. As shown in FIG. 1A, the headrest assembly 20 includes a stationary rear housing 24 having a headrest bun 22 coupled thereto on a front side thereof. The headrest bun 22 is contemplated to be a cushioned member configured to support the head of a vehicle occupant when the vehicle occupant seated in the vehicle seat 10. The vehicle seat 10 of FIG. 1A is shown as a driver's side vehicle seat, however, it is contemplated that the headrest assembly 20 of the present invention may be disposed on any seat within a vehicle, including passenger seats, rear seats, folding seats and third row passenger seat options. Further, the headrest assembly 20 is not limited to use with automotive vehicle seats, but can also be used in other applications, including, but not limited to, airplanes, buses, trains, boats or even stationary furniture assemblies. As such, the headrest assembly 20 shown disposed on the vehicle seat 10 in FIG. 1A is not intended to limit the spirit of the invention in any manner.

The headrest assembly 20 of the present concept is an adjustable headrest assembly, wherein the headrest bun 22 is contemplated to be adjustable in a in a substantially horizontal direction, as indicated by arrow X between extended and retracted positions. The headrest bun 22 is also adjustable in a vertical direction, as indicated by arrow Z, between raised and lowered positions, relative to the rear housing 24. In the position shown in FIG. 1A, the headrest bun 22 is contemplated to be in a home position H which correlates to the headrest bun 22 being in the lowered vertical position and the retraced horizontal position, such that the headrest bun 22 is disposed directly adjacent to the rear housing 24. Vertical and horizontal movement of the headrest bun 22 is contemplated to be powered by one or more electronic adjustment mechanisms, as further described below. As such, that the headrest assembly 20 is contemplated to be electrically coupled to a power supply of the vehicle 12 for powering horizontal and vertical movement of the headrest bun 22. Further, the headrest assembly 20 also includes a number of manually adjustable features as further described below.

Figure 1B:
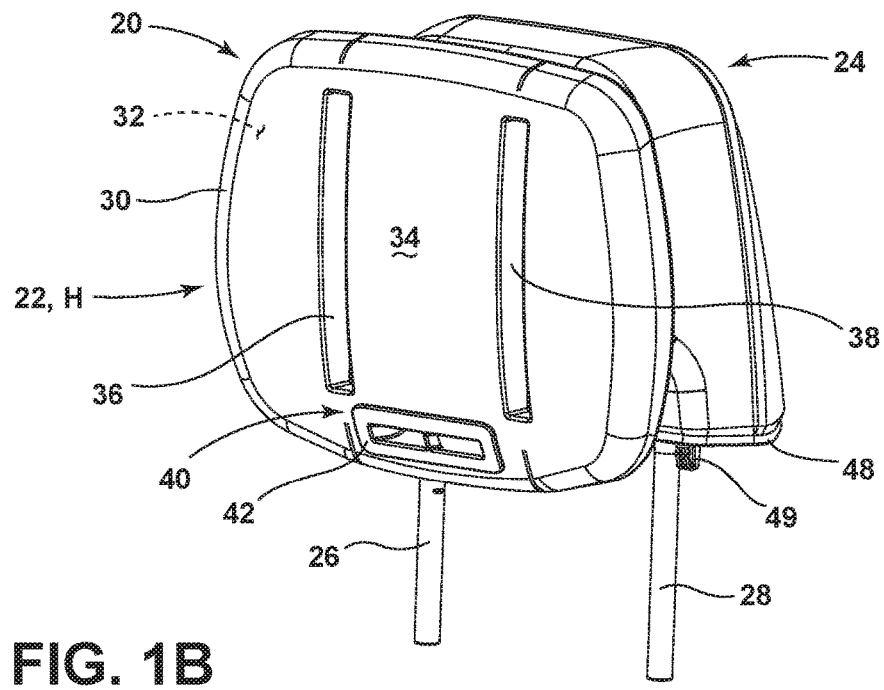
FIG. 1B is a front perspective view of the headrest assembly of FIG. 1A.
Figure 17:
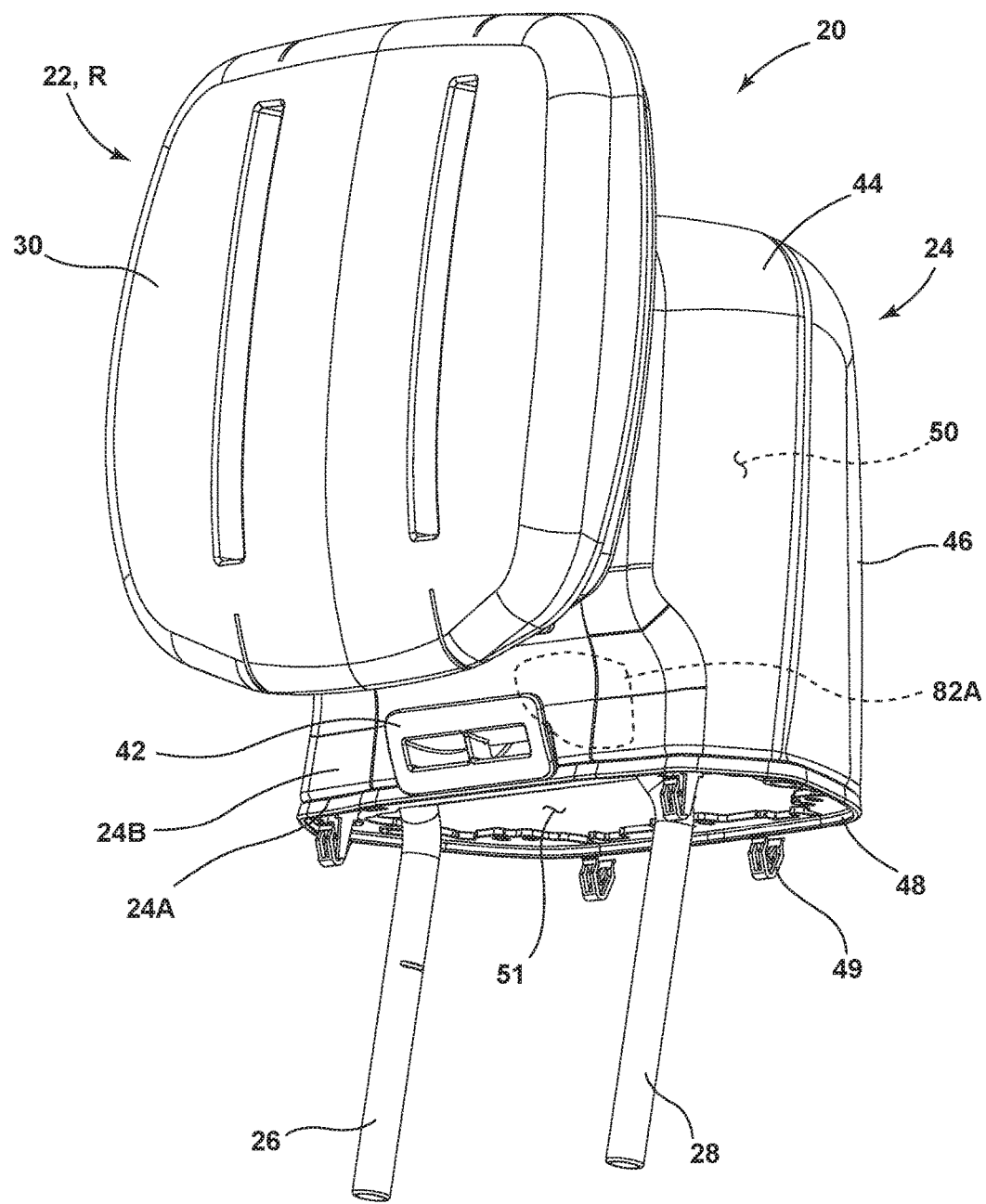
FIG. 17 is a front perspective view of a headrest assembly having an air moving system mounted to a rear housing thereof.

Referring now to FIG. 1B, the headrest assembly 20 is shown with the headrest bun 22 in the home position H. The headrest assembly 20 includes first and second supports 26, 28 which are upright supports that are used to mount the headrest assembly 20 to the upper portion 18A of the seatback 18 of the vehicle seat 10 shown in FIG. 1A. The first and second supports 26, 28 upwardly extend into the rear housing 24 and serve as a mounting location for numerous features of the headrest assembly 20, as further described below. As further shown in FIG. 1B, the headrest bun 22 includes a trim cover 30 which is generally disposed over a cushion material 32 to provide a padded comfort feature for the headrest bun 22. The headrest bun 22 includes a front surface 34 having first and second elongate recesses 36, 38 disposed thereon, which inwardly extend into the headrest bun 22. In use, the elongate recesses 36, 38 provide for flexibility of the headrest bun 22 to provide an adjustable cradle feature, as further described below. As further shown in FIG. 1B, the headrest assembly 20 includes a ventilation system 40 having a vent cover 42 disposed on the front surface 34 of the headrest bun 22. As further described below, the ventilation system 40 is configured to provide heated, cooled, or ambient air ventilation to the head of a vehicle occupant. While the vent cover 42 is shown disposed on a lower portion of the headrest bun 22, it is further contemplated that the vent cover 42 can be disposed on any portion of the headrest assembly 20 including the rear housing 24, as shown in FIG. 17. Further, it is contemplated that multiple vent covers can be disposed on various locations of the headrest assembly 20 to provide a ventilation feature where desired.

Figure 1C:
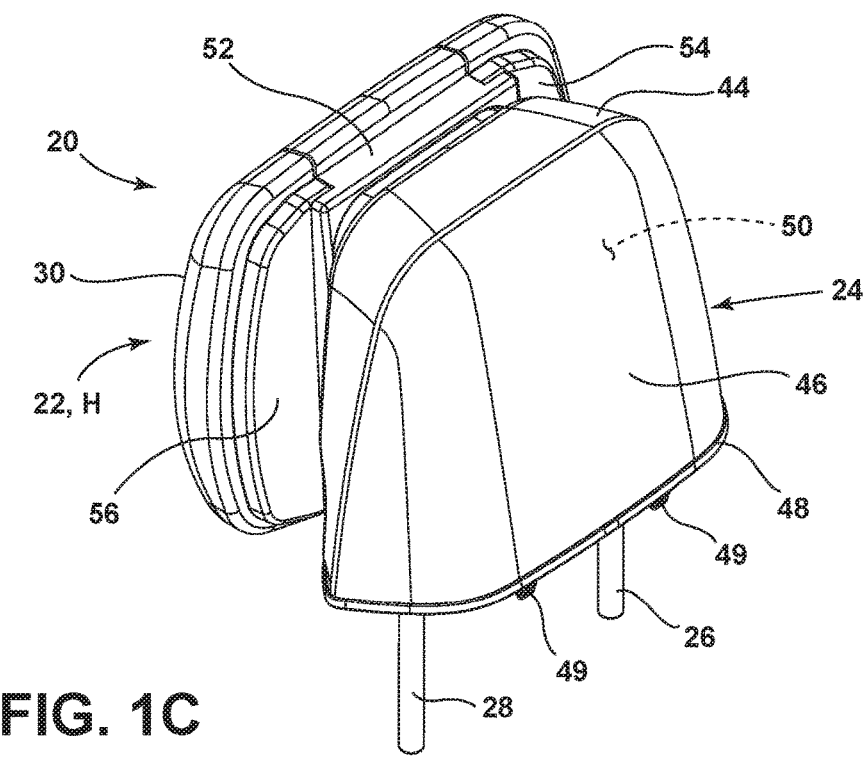
FIG. 1C is a rear perspective view of the headrest assembly of FIG. 1B.

Referring now to FIG. 1C, the headrest assembly 20 is shown from a rear perspective view, wherein the rear housing 24 is shown having a front cover 44 and a rear cover 46 which are coupled to a base plate 48 and cooperate to define an interior cavity 50 of the rear housing 24. Clip members 49 downwardly extend from the base plate 48 and are used to couple the base plate 48 to a portion of the vehicle seat 10 in assembly. The first and second supports 26, 28 upwardly extend into the interior cavity 50 of the rear housing 24 to operably support the headrest bun 22 therefrom. As further shown in FIG. 1C, the headrest bun 22 includes a central support member 52 disposed on a rear side of the headrest bun 22. The support member 52 has first and second side bolsters 54, 56 pivotally coupled thereto. The adjustment and configuration of the first and second side bolsters 54, 56 are further described below.

Figure 2:
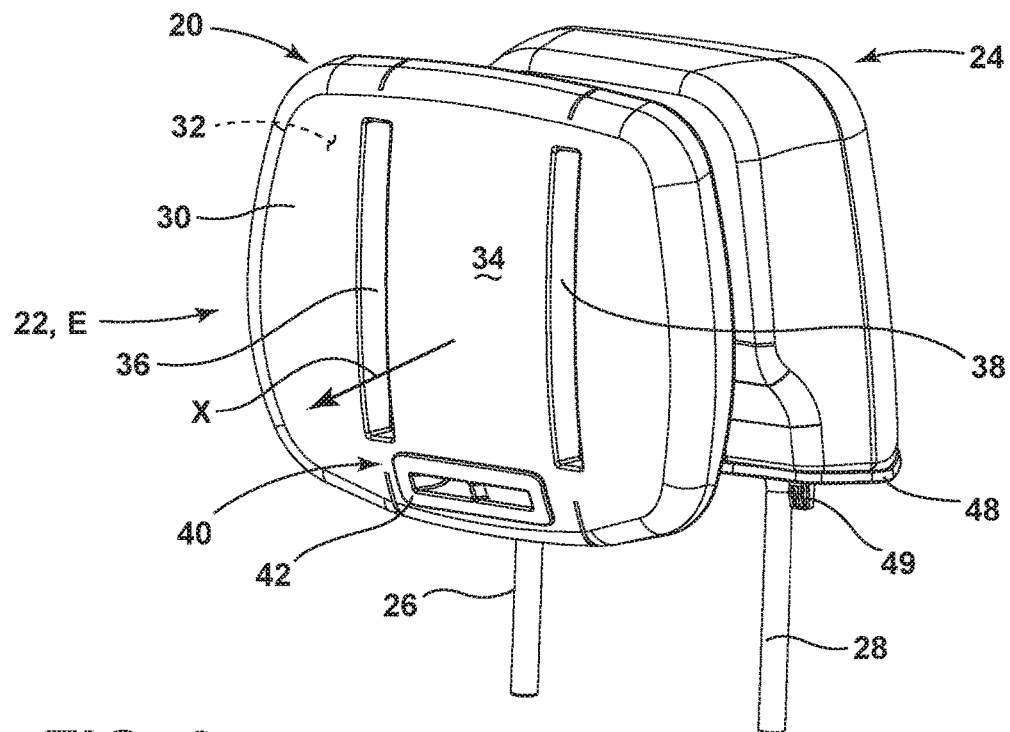
FIG. 2 is a front perspective view of the headrest assembly of FIG. 1B showing a headrest bun in an outwardly extended position.

Referring now to FIG. 2, the headrest bun 22 of the headrest assembly 20 is shown in an outwardly extending position E, such that the headrest bun 22 has traveled in a direction as indicated by arrow X from the home position H shown in FIG. 1B. The direction indicated by arrow X is contemplated to be a car-forward direction for the headrest assembly 20 as positioned on a vehicle seat, such as vehicle seat 10 shown in FIG. 1A. As noted above, the rear housing 24 is a stationary part that provides support for the adjustable headrest bun 22. Thus, it is contemplated that the rear housing 24 remains stationary as mounted to the upper portion 18A of the seatback 18 as shown in FIG. 1A, while the headrest bun 22 moves forward in the direction as indicated by the arrow X to the extended position E.

Figure 3:
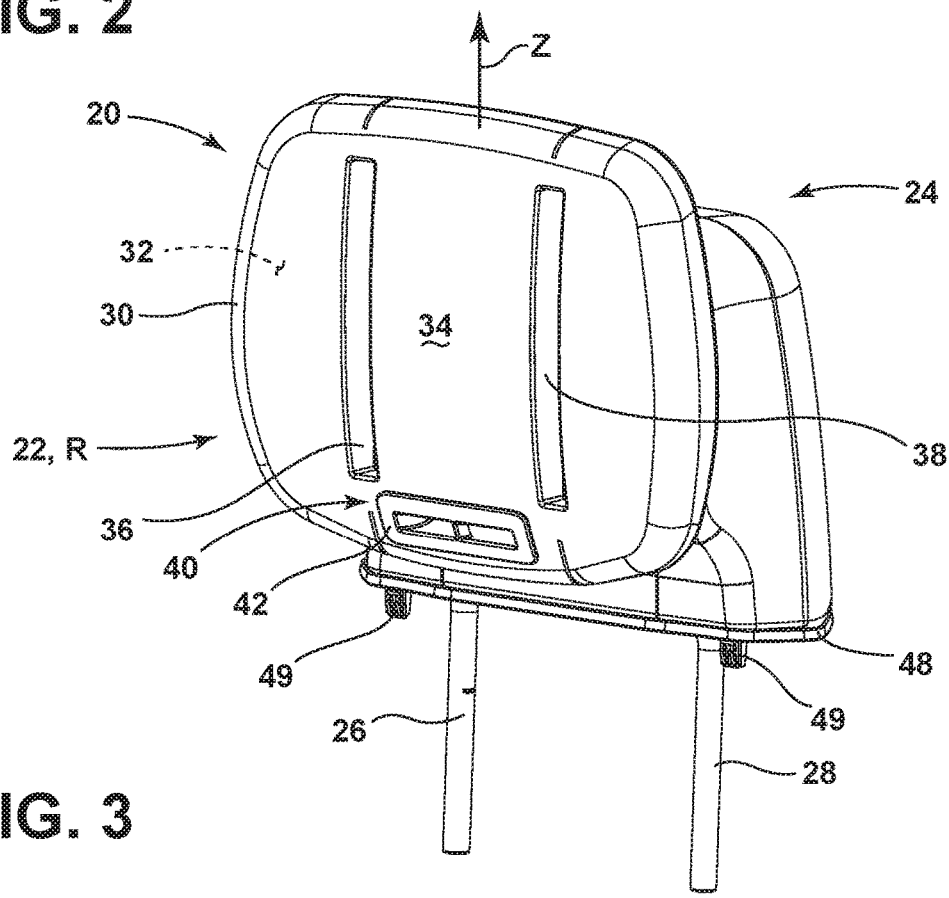
FIG. 3 is a front perspective view of the headrest assembly of FIG. 2 showing the headrest bun in a vertically raised position.

Referring now to FIG. 3, the headrest bun 22 is shown in a raised position R, such that the headrest bun 22 has moved in a vertically upward direction as indicated by arrow Z relative to the rear housing 24. Movement of the headrest bun 22 from a lowered position, such as the position shown in FIG. 1B, to the raised position R is contemplated to be powered by an adjustment mechanism, as further described below.

Figure 4:
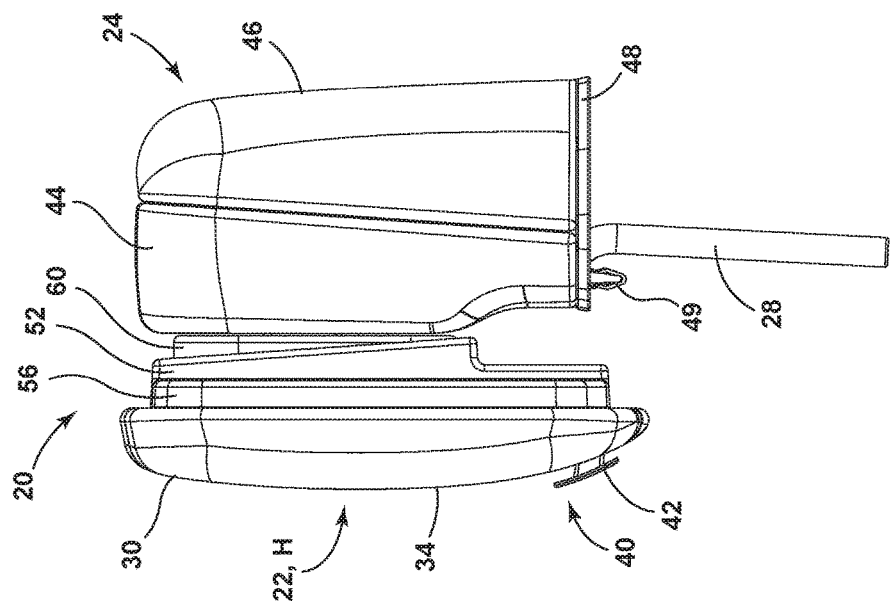
FIG. 4 is a side elevational view of the headrest assembly of FIG. 1B.

Referring now to FIG. 4, the headrest assembly 20 is shown with the headrest bun 22 in the home position H as coupled to and supported on the rear housing 24. In the view of FIG. 4, a mounting plate 60 is shown disposed between the rear housing 24 and the headrest bun 22 to which the central support member 52 is pivotally mounted. Being pivotally mounted to the mounting plate 60, the central support member 52 provides for a tilt-adjustment of the headrest bun 22 from the home position H (FIG. 4) to an angled position T shown in FIG. 5. Thus, in FIG. 5, the headrest bun 22 has pivoted relative to the mounting plate 60 and rear housing 24 in a direction as indicated by arrow Y. Specifically, the lower portion of the headrest bun 22 has moved outward and upward in the curved direction as indicated by arrow Y to provide a rearward-tilt position T for the headrest bun 22. In this way, the front surface 34 of the headrest bun 22 is adjustable to the angled position T to provide another comfort support option for a vehicle occupant.

Figure 6:
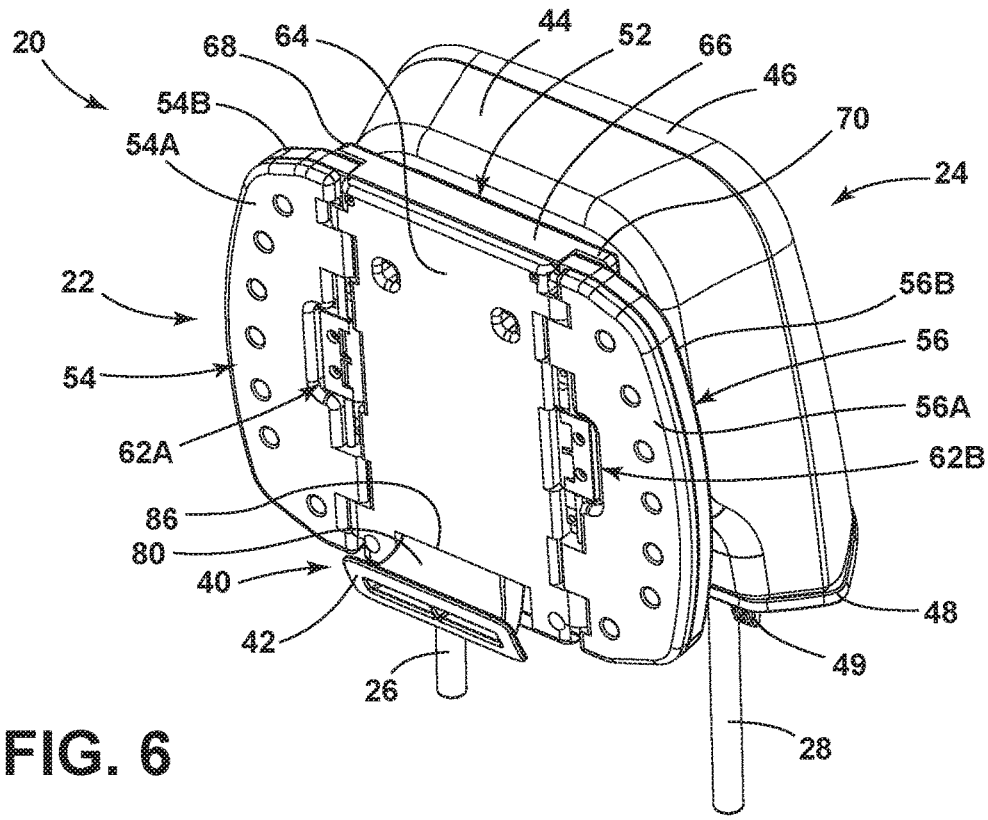
FIG. 6 is a front perspective view of the headrest assembly of FIG. 1B with trim components removed from the headrest bun to reveal adjustable side bolsters.

Referring now to FIG. 6, the trim cover 30 and cushion material 32 have been removed from the headrest bun 22 to reveal the first and second side bolsters 54, 56 which are pivotally coupled to the central support member 52 via hinge assemblies 62A, 62B. In FIG. 6, the first and second side bolsters 54, 56 are shown in retracted positions to provide a generally flat front surface for the headrest bun 22. The first and second side bolsters 54, 56 include front and rear portions 54A, 54B and 56A, 56B, respectively. The front portions 54A, 56A are coupled to the central support member 52 via the hinge assemblies 62A, 62B, respectively. Specifically, the central support member 52 includes a front panel 64 and a rear panel 66. The front portions 54A, 56A of the first and second side bolsters 54, 56 are coupled to the front panel 64 of the central support member 52 via the hinge assemblies 62A, 62B at opposite ends of the front panel 64. The rear panel 66 of the central support member 52 includes first and second outwardly extending tabs 68, 70 disposed on opposite sides of the central support member 52, which abut the rear portions 54B, 56B of the first and second side bolsters 54, 56 to provide a stop feature to limit the rearward movement of the first and second side bolsters 54, 56 at the fully retracted position. Thus, as shown in FIG. 6, with the first and second side bolsters 54, 56 in retracted positions, the rear portions 54B, 56B thereof abut the tabs 68, 70 of the rear panel 66 of the central support member 52 to provide a stop feature to limit movement of the first and second side bolsters 54, 56 when the first and second side bolsters 54, 56 have reached the fully retracted position. As shown in FIG. 6, the first and second side bolsters 54, 56 are disposed on opposite ends along a perimeter of the headrest bun 22.

Figure 7:
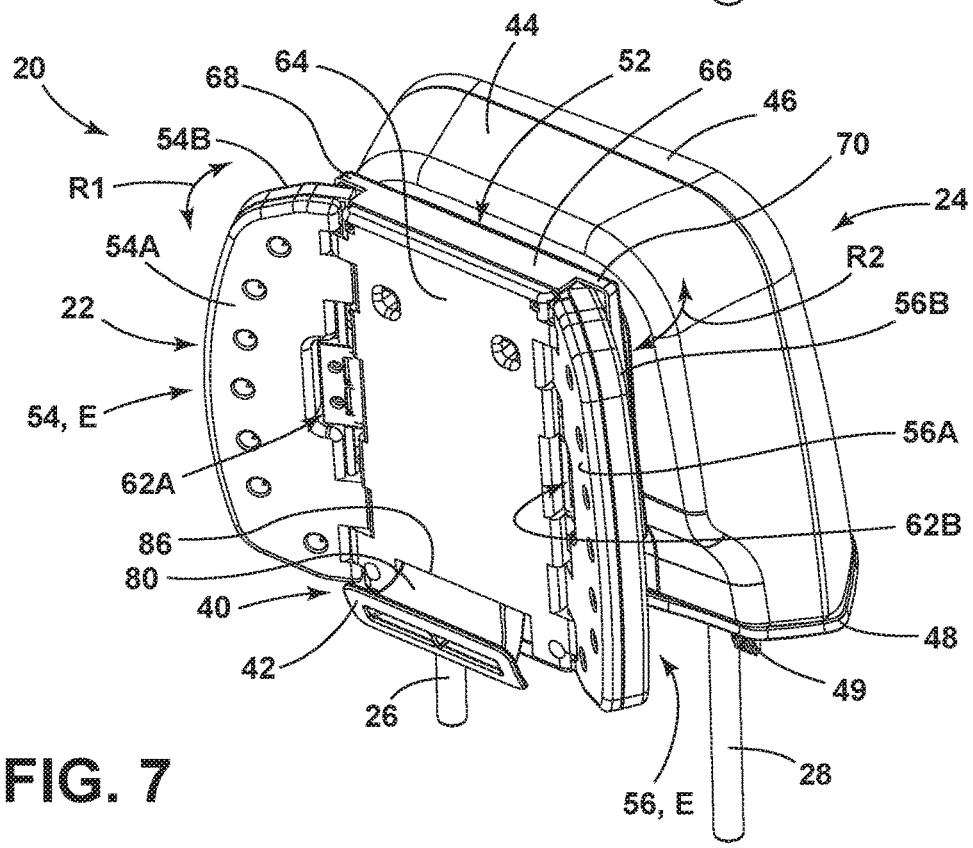
FIG. 7 is a front perspective view of the headrest assembly of FIG. 6 showing the side bolsters in outwardly extended positions.

Referring now to FIG. 7, the first and second side bolsters 54, 56 are shown in forward extended positions E, wherein the first and second side bolsters 54, 56 are rotated in a forward direction at hinge assemblies 62A, 62B relative to the central support member 52. In this way, the headrest bun 22 is provided with a cradle effect for cradling the head of a vehicle occupant. The hinge assemblies 62A, 62B are contemplated to be friction hinge assemblies or constant torque hinge assemblies, which are manually operated by a user engaging one of the first and second side bolsters 54, 56 and pivoting the engaged side bolster in a forward and inward direction. Movement of the first and second side bolsters 54, 56 is contemplated to be independent of one another, such that the first and second side bolsters 54, 56 can rotate along the paths as indicated by arrows R1 and R2 independently of one another. As noted above, the headrest bun 22 includes elongate recesses 36, 38 (FIGS. 1B and 18) disposed on the pivot axes of the first and second side bolsters 54, 56. In this way, the elongate recesses 36, 38 provide reliefs for increased flexibility of the headrest bun 22 as the first and second side bolsters 54, 56 articulate between extended and retracted positions.

Thus, the headrest assembly 20 of the present concept provides for a headrest bun 22 that is adjustable in ten different ways. Specifically, the headrest bun 22 is adjustable in the vertical direction along the path as indicated by arrow Z in FIG. 3, between raised and lowered positions. The headrest bun 22 is also movable in the horizontal direction as indicated by arrow X in FIG. 2, between extended and retracted positions. The four-way movement indicated in FIGS. 2 and 3 is contemplated to be powered movement provided by powered adjustment mechanisms, as further described below. Further, the headrest bun 22 is contemplated to be manually adjustable along the path as indicated by arrow Y shown in FIG. 5 to a rearward tilt position T from the home position H, shown in FIG. 4. This two-way movement of the headrest bun 22 between the home position H and the tilt position T provides for a six-way adjustable headrest assembly 20. With the independent movement of both the first and second side bolsters 54, 56, as shown in FIGS. 6 and 7 along the paths indicated by arrows R1 and R2, the headrest assembly 20 provides for a headrest bun 22 having ten-way adjustability. Specific features providing for the adjustability of the headrest bun 22 will now be described.

Figure 8:
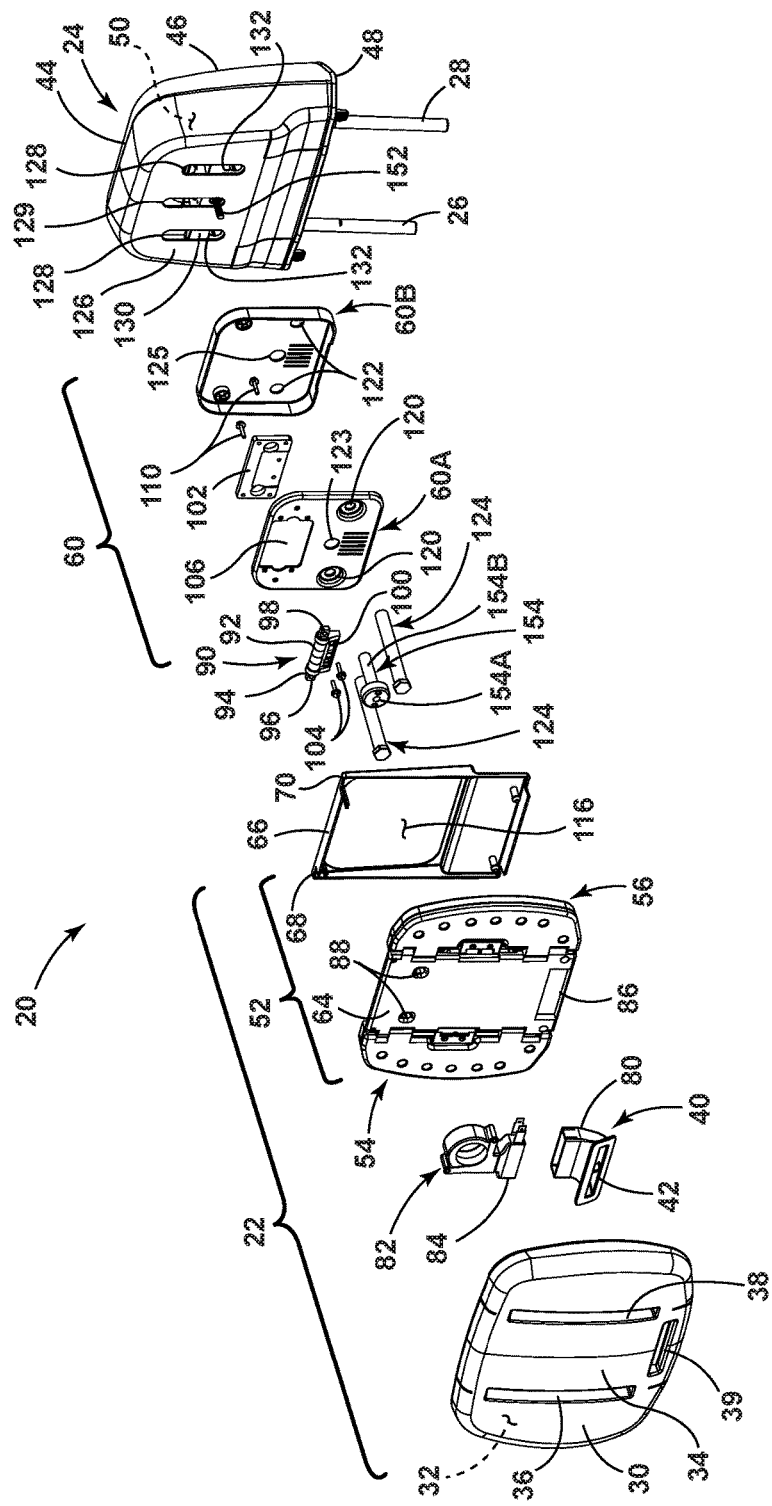
FIG. 8 is a front exploded view of the headrest assembly of FIG. 1B.

Referring now to FIG. 8, the headrest bun 22 is shown in an exploded view, wherein the cushion member 32 and trim cover 30 are exploded away from the central support member 52 and first and second side bolsters 54, 56. As further shown in FIG. 8, the cushion member 32 and trim cover 30 include an aperture 39 disposed therethrough to which the vent cover 42 of the ventilation system 40 is coupled in assembly. In FIG. 8, the ventilation system 40 is shown having a duct assembly 80, to which the vent cover 42 is coupled. In assembly, the duct assembly 80 interconnects the vent cover 42 with an air moving device 82. The air moving device 82 may include an integrated or non-integrated heating element 84 that is in thermal communication with the air moving device 82 for heating air to be expelled through the vent cover 42 by the air moving device 82. The air moving device 82 may include a fan or other air moving system that is contemplated to be mounted to an inner surface of the front panel 64 of the central support member 52. The air moving device 82 is partially enclosed by the rear panel 66 of the central support member 52 when the rear panel 66 is coupled to the front panel 64 of the central support member 52. Thus, the air moving device 82 is disposed within an interior of the central support member 52 defined by the enclosure created by the coupling of the front panel 64 with the rear panel 66. The front panel 64 of the central support member 52 includes a lower aperture 86 through which the duct assembly 80 of the ventilation system 40 is routed, as best shown in FIGS. 6 and 7. As noted above, the central support member 52 is disposed within an interior of the head rest assembly and operably coupled to the mounting plate 60 for pivotal movement therefrom. Specifically, the front panel 64 of the central support member 52 includes mounting apertures 88, which operably couple the central support member 52 to a hinge assembly 90. The hinge assembly 90 includes an outer casing 92 surrounding a rod 94 having first and second ends 96, 98. The outer casing 92 further includes a mounting portion 100 which is used to mount the hinge assembly 90 to the mounting plate 60. Specifically, the hinge assembly 90 is mounted to a mounting bracket 102 via fasteners 104. The mounting bracket 102 is mounted to a front cover 60A of the mounting plate 60. As shown in FIG. 8, and further shown in FIG. 9, the mounting plate 60 includes front cover 60A and rear cover 60B which couple to one another to form an interior cavity in which the mounting bracket 102 is disposed in assembly. The mounting bracket 102 is accessed via an access aperture 106 disposed through the front cover 60A of the mounting plate 60, such that the hinge assembly 90 can be mounted to the mounting bracket 102 via fasteners 108. As specifically shown in FIG. 9, fasteners 110 extend through access apertures 112, 114 of the mounting bracket 102 to engage the ends 96, 98 of the hinge assembly 90 and further couple to the mounting apertures 88 of the front panel 64 of the central support member 52, such that the central support member 52 is pivotally coupled to the mounting plate 60. The connection of the front panel 64 to the hinge assembly 90 is provided by access through access aperture 116 disposed through the rear panel 66 of the central support member 52 as shown in FIG. 8. As noted above, the hinge assembly 90 is contemplated to be a friction hinge assembly in which the rod 94 rotates along the path as indicated by arrow Y for movement of the headrest assembly between the upright position and the angled position T shown in FIGS. 4 and 5, respectively.

Figure 9:
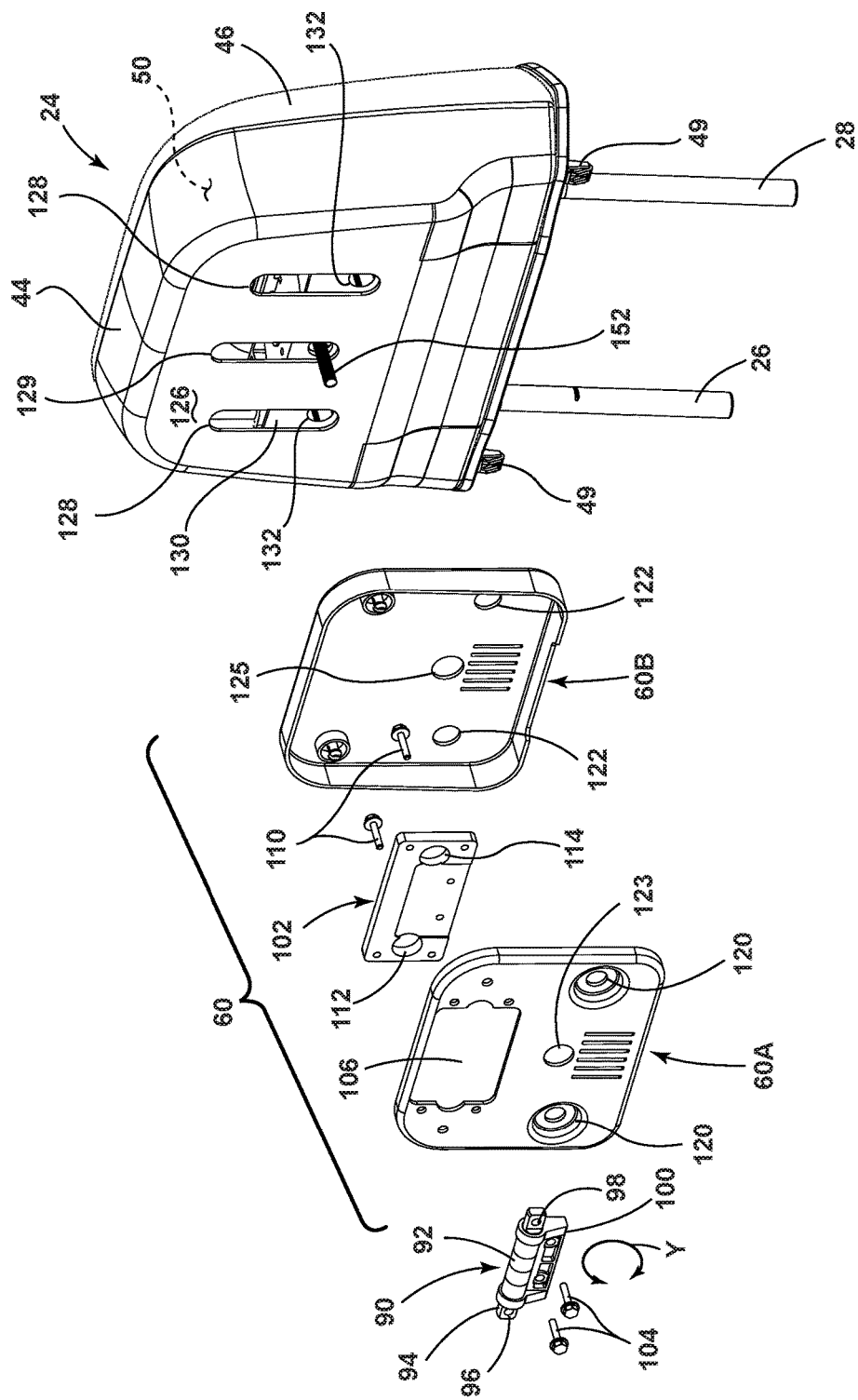
FIG. 9 is a front exploded view of a hinge assembly, mounting plate and rear housing of the headrest assembly of FIG. 8.

As further shown in FIGS. 8 and 9, the front and rear covers 60A, 60B of the mounting plate 60 include receiving apertures 120, 122 through which guide members 124 are disposed in assembly. The guide members 124 are elongate cylinder shaped members which extend through the mounting plate 60 via receiving apertures 120, 122 and are slideably received in access channels 132 of a guide bracket 130 which is disposed within the interior cavity 50 of the rear housing 24. Details of the guide bracket 130 are further described below. In order to access the guide bracket 130 within the interior cavity 50 of the rear housing 24, the guide members 124 extend through vertically disposed slots 128 disposed on a front surface 126 of the front cover 44 of the rear housing 24. In use, the guide members 124 guide the horizontal movement of the headrest bun 22 via a motor housed within the rear housing 24.

As further shown in FIGS. 8 and 9, the front surface 126 of the front cover 44 of the rear housing 24 further includes a vertically disposed slot 129 disposed between vertically disposed slots 128. A driveshaft 152 is shown extending outwardly from the vertically disposed center slot 129 from the guide bracket 130. The driveshaft 152 is configured to couple to a drive member 154 having a head portion 154A and a body portion 154B. It is contemplated that the body portion 154B is an internally threaded member that can threadingly engage the driveshaft 152 in a manner, such that the drive member 154 translates horizontally via rotation of the driveshaft 152. The head portion 154A of the drive member 154 mounts to a mounting aperture 123 disposed in the front cover 60A of the mounting plate 60. The body portion 154B of the drive member 154 extends through a receiving aperture 125 disposed in the rear cover 60B of the mounting plate 60 to interconnect with the driveshaft 152. With the drive member 154 coupled with the driveshaft 152 in a threaded engagement and further coupled to the mounting plate 60, rotation of the driveshaft 152 causes fore and aft translation of the drive member 154, thereby causing the mounting plate 60 to move between extended and retracted positions. With the headrest bun 22 mounted to the mounting plate 60, the headrest bun 22 also translates in the fore and aft direction between extended and retracted positions along the path as indicated by arrow X in FIG. 2. The vertically disposed slots 128, 129 of the rear housing 24 provide for vertical movement of the guide bracket 130 within the interior cavity 50 of the rear housing 24. Thus, the guide members 124 and the drive member 154 remain coupled to the guide bracket 130 as the guide bracket 130 moves vertically along the first and second supports 26, 28 within the interior cavity 50 of the rear housing 24, as further described below.

Figure 10:
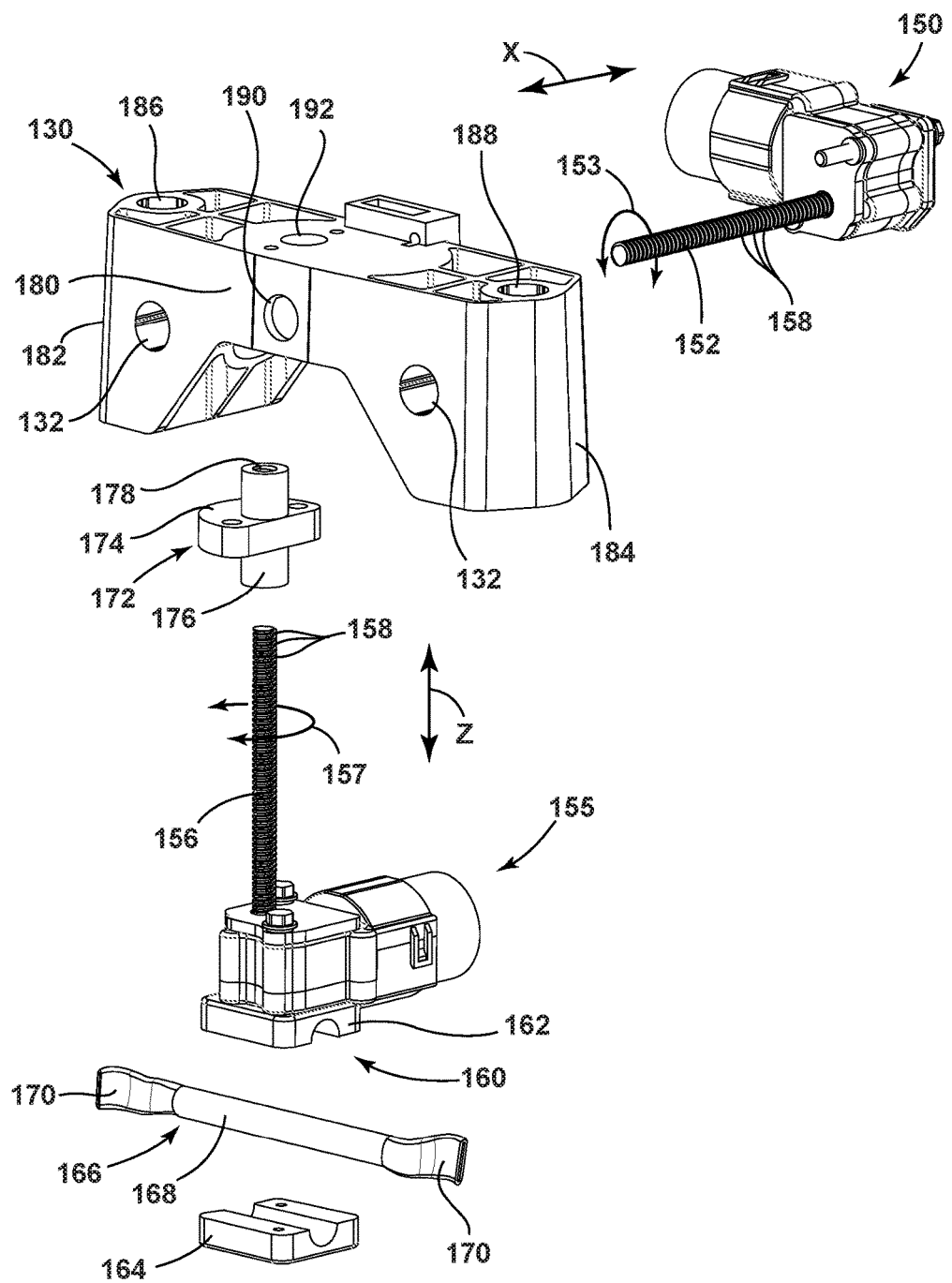
FIG. 10 is an exploded front perspective view of adjustment mechanisms and a guide bracket assembly.
Figure 11A:
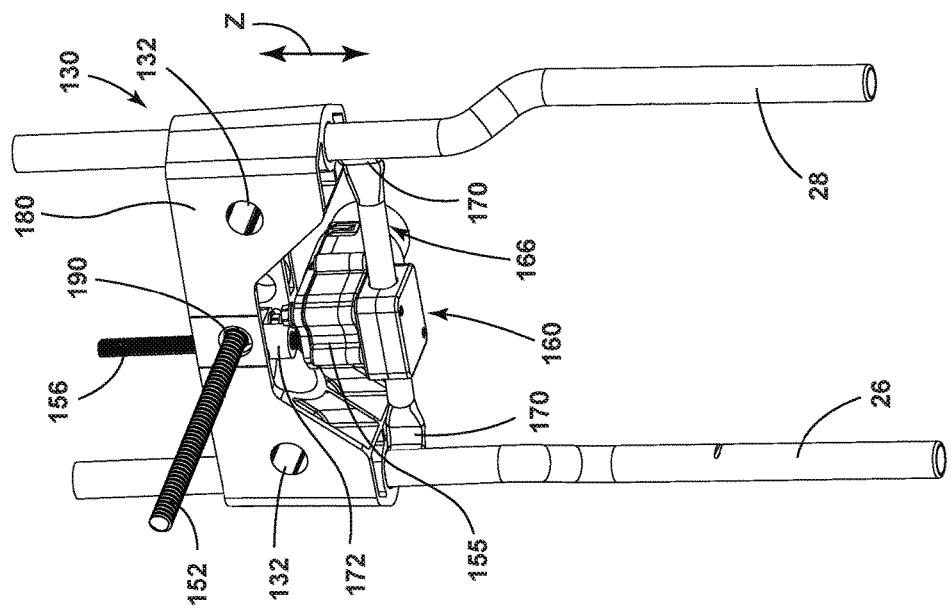
FIG. 11A is an assembled top perspective view of the adjustment mechanisms and guide bracket of FIG. 10 disposed on first and second upright supports.
Figure 11B:
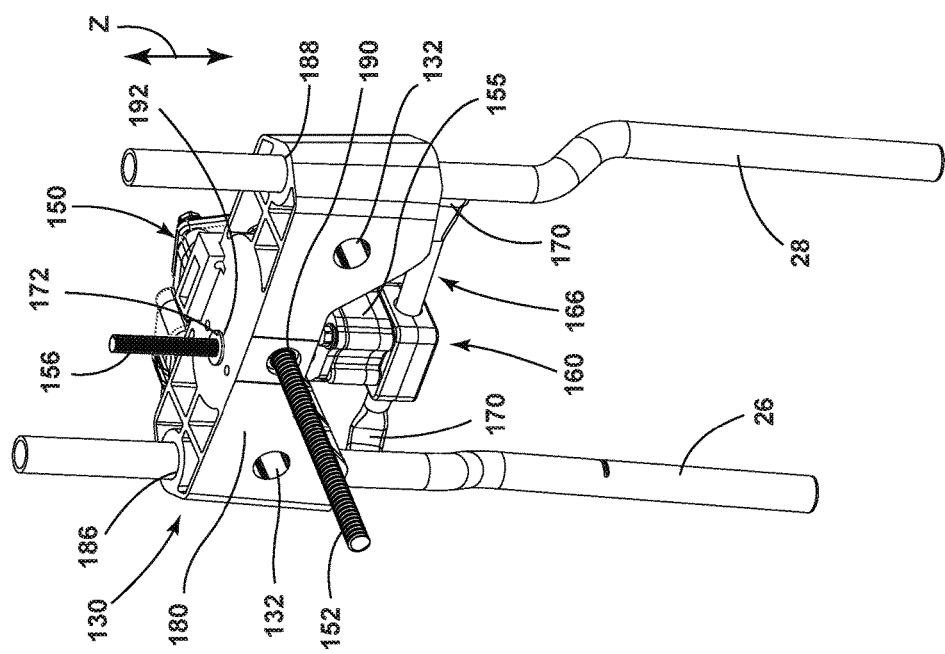
FIG. 11B is a bottom perspective view of the adjustment mechanisms and guide bracket of FIG. 11A.

Referring now to FIG. 10, adjustment mechanisms for use in conjunction with the guide bracket 130 are shown. Specifically, the adjustment mechanisms shown in FIG. 10 are shown in the form of motors 150, 155 having driveshafts 152, 156, respectively. The motors 150, 155 define first and second motors and are configured to drive or rotate the driveshafts 152, 156 in the direction as indicated by arrows 153, 157, respectively. As shown in FIG. 10, the driveshaft 156 is a vertically disposed driveshaft having a plurality of threads 158 disposed therealong. In use, the motor 155 and driveshaft 156 is configured to vertically adjust the guide bracket 130 as disposed within the interior cavity 50 of the rear housing 24. Thus, motor 155 defines an adjustment mechanism that powers movement of the headrest bun 22 of the headrest assembly along the vertical Z access. The motor 150, being horizontally disposed, defines a power adjustment mechanism that is configured to drive the headrest bun 22 of the headrest assembly 20 along the X axis between extended and retracted positions. Motor 155 is mounted on a clamp assembly 160 having an upper portion and a lower portion which is used to mount the motor 155 on a support bar 166. The support bar 166 includes first and second ends 170 having a body portion 168 disposed therebetween. The first and second ends 170 are configured to couple to the first and second upright supports 26, 28 as best shown in FIGS. 11A and 11B. The upper and lower portions 162, 164 of the clamp assembly 160 clamp to the body portion 168 of the support bar 166 to fixedly mount the motor 155 thereto with the driveshaft 156 in a vertically disposed position. A ferrule member 172 includes a mounting portion 174 disposed around a cylinder 176. The cylinder 176 is contemplated to have an internally threaded interior portion 178 that is configured to threadingly engage the threads 158 of the vertically disposed driveshaft 156 of motor 155. The mounting portion 174 of the ferrule member 172 is a plate member used to mount the ferrule member 172 to an underside of the guide bracket 130 (See FIG. 11B). It is contemplated that the ferrule member 172 may also be an integrally molded part within the vertically adjustable guide bracket 130. The driveshaft 152 of motor 150 also includes threads 158 which are used to threadingly engage the drive member 154 shown in FIG. 8 for horizontal movement of the headrest bun 22.

As further shown in FIG. 10, the vertically adjustable guide bracket 130 includes a body portion 180 having first and second ends 182, 184. The first and second ends 182, 184 include vertically disposed access channels 186, 188 in which the first and second upright supports 26, 28, respectively, are received. As further shown in FIG. 10, the horizontally disposed access channels 132 are disposed near the first and second ends 182, 184 of the guide bracket 130. A centrally disposed access channel 190 is positioned between the access channels 132 and is configured to provide access for the driveshaft 152 of the motor 150 to pass therethrough. As further described below, the motor 150 is mounted to the guide bracket 130 for vertical movement therewith as powered by the motor 155. As further shown in FIG. 10, the body portion 180 of the guide bracket 130 further includes a vertically disposed access aperture 192 which allows for the driveshaft 156 of the motor 155 to pass therethrough as the guide bracket 130 moves downwardly along the first and second supports 26, 28.

Referring now to FIG. 11A, the vertically adjustable guide bracket 130 is shown disposed on the first and second upright supports 26, 28 for vertical movement along the vertical axis indicated by arrow Z. The first and second supports 26, 28 are shown interconnected by the support bar 166 having ends 170 which are contemplated to be fixedly coupled to the upright supports 26, 28 by welding or other like fastening means. The motor 155 responsible for vertical movement of the guide bracket 130 is shown mounted to the support bar 166 via clamp assembly 160. The vertically disposed driveshaft 156 of the motor 155 is shown disposed through the vertically disposed access aperture 192 of the guide bracket 130 in which an upper portion of the ferrule member 172 is shown in FIG. 11A. Thus, with the ferrule member 172 mounted to the body portion 180 of the guide bracket 130, the motor 155 can drive the guide bracket 130 vertically along the upright supports 26, 28 in the direction as indicated by arrow Z due to the threaded engagement of the vertically disposed driveshaft 156 of the motor 155 and the internally threaded ferrule member 172. The motor 150 configured for horizontal adjustment is shown coupled to the body portion 180 of the guide bracket 130 on a rear side thereof, such that the horizontally disposed driveshaft 152 of the motor 150 extends outwardly from the centrally disposed access channel 190 of the guide bracket 130.

With reference to FIG. 11B, the same configuration of the guide bracket 130 and the motors 150, 155 and upright supports 26, 28 is shown, wherein the driveshaft 156 of motor 155 is shown engaged with the ferrule member 172 that is mounted to the body portion 180 of the guide bracket 130. As shown in FIGS. 11A, 11B, the vertically adjustable guide bracket 130 interconnects the first and second upright supports 26, 28 via the reception of the first and second upright supports 26, 28 through the vertically disposed access channels 186, 188 in a sliding manner. Thus, with the lower portions of the first and second supports 26, 28 mounted to an upper portion of a seatback, such as upper portion 18A of seatback 18 shown in FIG. 1A, the guide bracket 130 guides vertical movement of the headrest bun 22 between raised and lowered positions (shown in FIGS. 1B and 3) by vertically sliding along the upright supports 26, 28.

Figure 12:
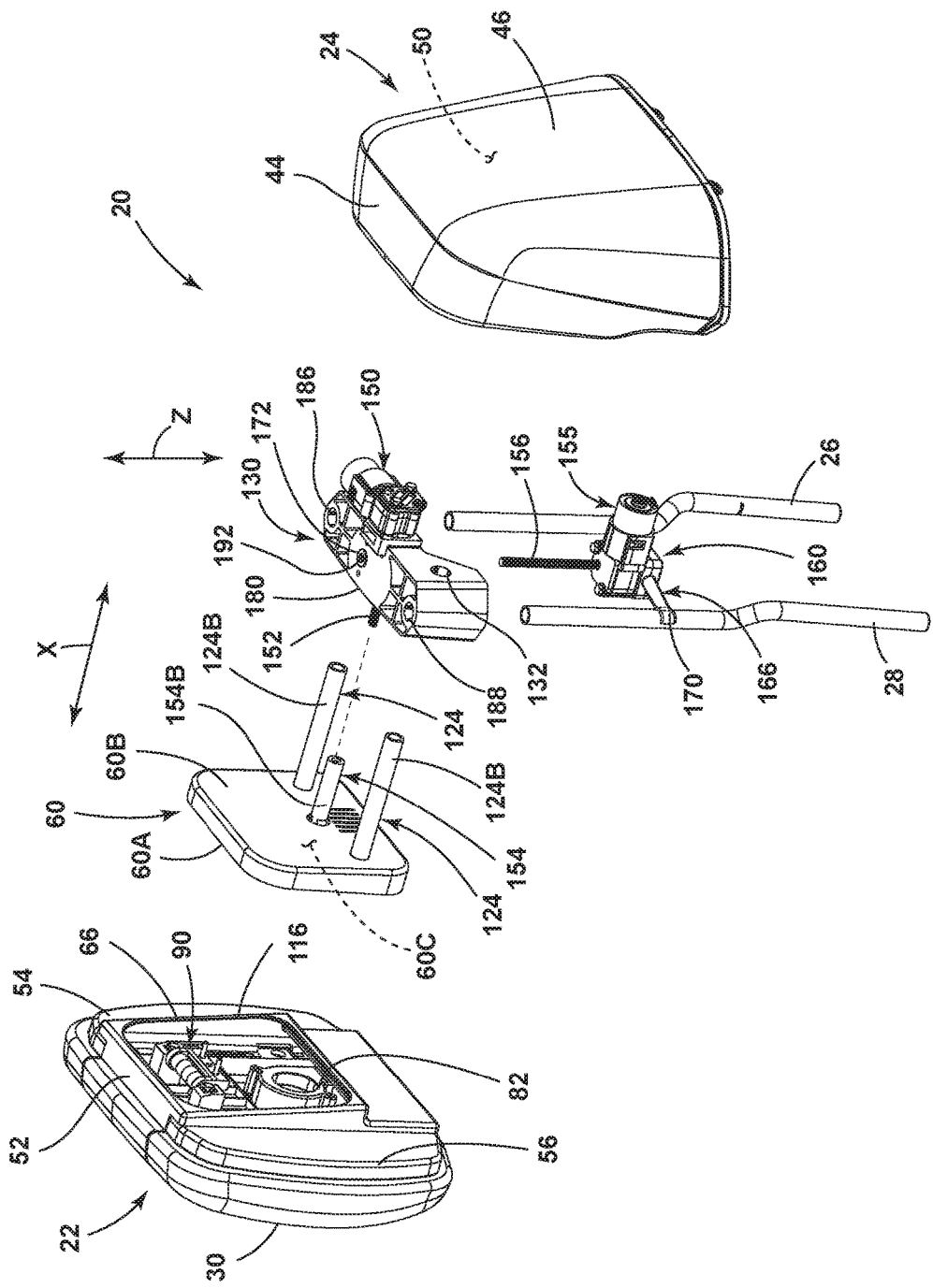
FIG. 12 is an exploded top perspective view of the headrest assembly of FIG. 1C showing the headrest bun exploded away from a mounting plate and a guide bracket exploded away from first and second upright supports which are further exploded away from the rear housing.
Figure 13:
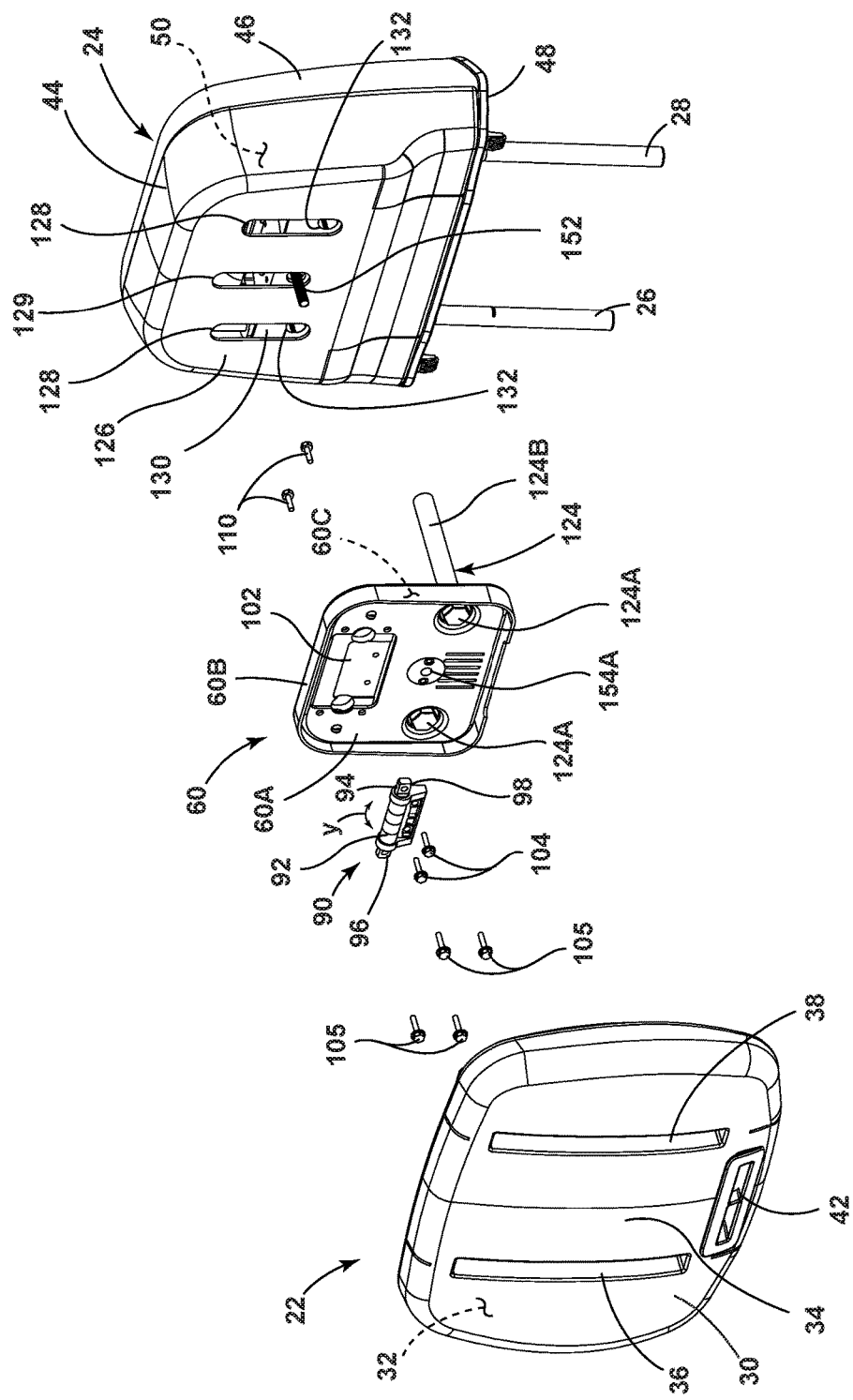
FIG. 13 is an exploded top perspective view of the headrest assembly of FIG. 12 with the guide bracket and upright supports disposed within the rear housing and the headrest bun exploded away from the mounting plate.

Referring now to FIG. 12, the mounting plate 60 is shown assembled with the front and rear covers 60A, 60B coupled to one another to define an interior cavity 60C of the mounting plate 60. The drive member 154 is shown coupled to the mounting plate 60 via the head portion 154A as best shown in FIG. 13. As further shown in FIG. 12, the body portion 154B of the drive member 154 rearwardly extends from the mounting plate 60 to threadingly engage the driveshaft 152 of motor 150 which is mounted on the body portion 180 of the vertically adjustable guide bracket 130. Motor 155 is shown mounted to the first and second uprights 26, 28 via support bar 166. The upper portions of the supports 26, 28 are configured to be received in the interior cavity 50 of the rear housing 24 in assembly. The guide members 124 are further shown rearwardly extending from the mounting plate 60 as coupled thereto for reception through the horizontally disposed access channels 132 of the guide bracket 130 in a sliding manner. The guide members 124 have elongate body portions 124B which provide guided movement of the mounting plate 60 and the headrest bun 22, which is coupled to the mounting plate 60, during horizontal translation of the mounting plate 60 along the direction as indicated by arrow X. With the upright supports 26, 28 being slideably received through the vertically disposed access channels 186, 188 of the guide bracket 130 and the guide members 124 slideably disposed through the horizontally disposed access channels 132 of the guide bracket 130, the guide bracket 130 serves as a guide for both vertical and horizontal movement of the headrest bun 22 along the axes identified in FIG. 12 using arrows X and Z. As further shown in FIG. 12, the air moving device 82 is shown disposed within an interior of the headrest bun 22 and specifically disposed within an interior of the central support member 52 of the headrest bun 22.

Figure 5:
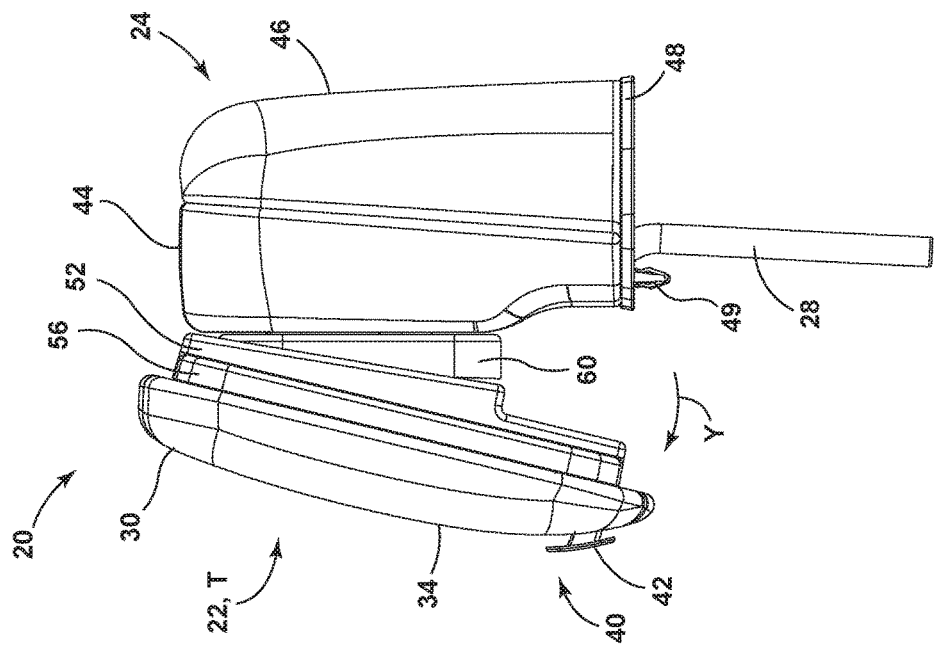
FIG. 5 is a side elevational view of the headrest assembly of FIG. 4 showing the headrest bun in an angled position.

Referring now to FIG. 13, the mounting plate 60 is shown having the mounting bracket 102 mounted within the interior cavity 60C of the mounting plate 60. The mounting bracket 102 is secured in place to the front cover 60A using fasteners 105. As further shown in FIG. 13, the head portion 154A of the drive member 154 is coupled to the front cover 60A of the mounting plate 60. The guide members 124 include head portions 124A which are fixedly coupled to the mounting plate 60 as well, such that the guide members 124 move horizontally and vertically with the mounting plate 60. In FIG. 13, the guide bracket 130 is shown disposed within the interior cavity 50 of the rear housing 24 with the upright supports 26, 28 partially disposed therein as well. The driveshaft 152 is configured for threading engagement with the drive member 154 of the mounting plate 60. The hinge assembly 90 is shown configured to be mounted to the mounting bracket 102 of the mounting plate 60 via fasteners 104, while the headrest bun 22 is configured to be mounted to the first and second ends 96, 98 via fasteners 110. Again, the first and second ends 96, 98 are ends of a rod 94 having a surrounding outer casing 92 which is configured for frictional adjustment along the rotational path indicated by arrow Y to provide a tilt feature for the headrest bun 22 as coupled to the mounting plate 60. In this way, the headrest bun 22 is pivotally coupled to the mounting plate 60 between upright and angled positions as shown in FIGS. 4 and 5 described above. As shown in FIG. 13, the first and second motors 150, 155 are disposed within the interior cavity 50 of the rear housing 24 in assembly.

Figure 14:
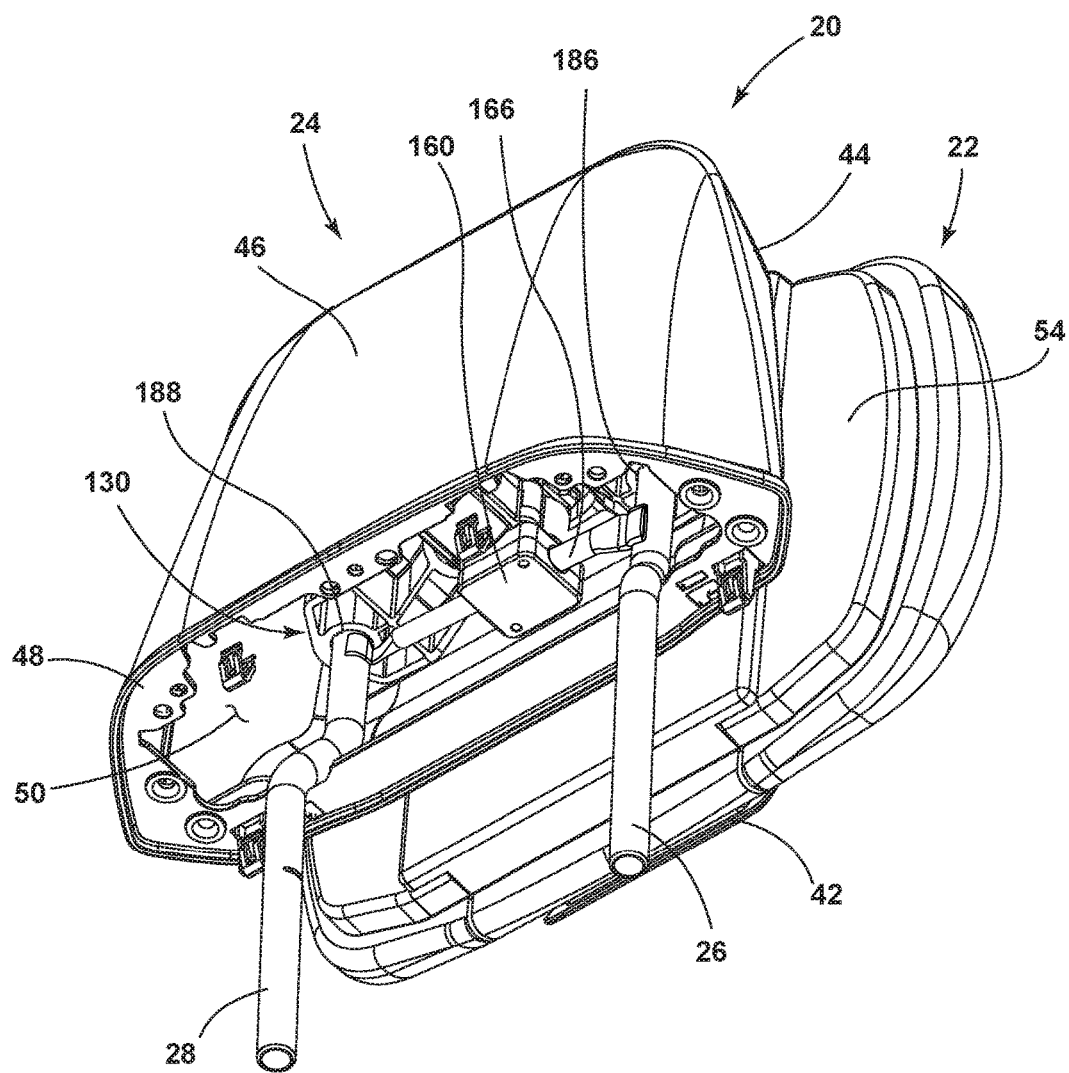
FIG. 14 is a bottom perspective view of the headrest assembly of FIG. 1B.
Figure 15:
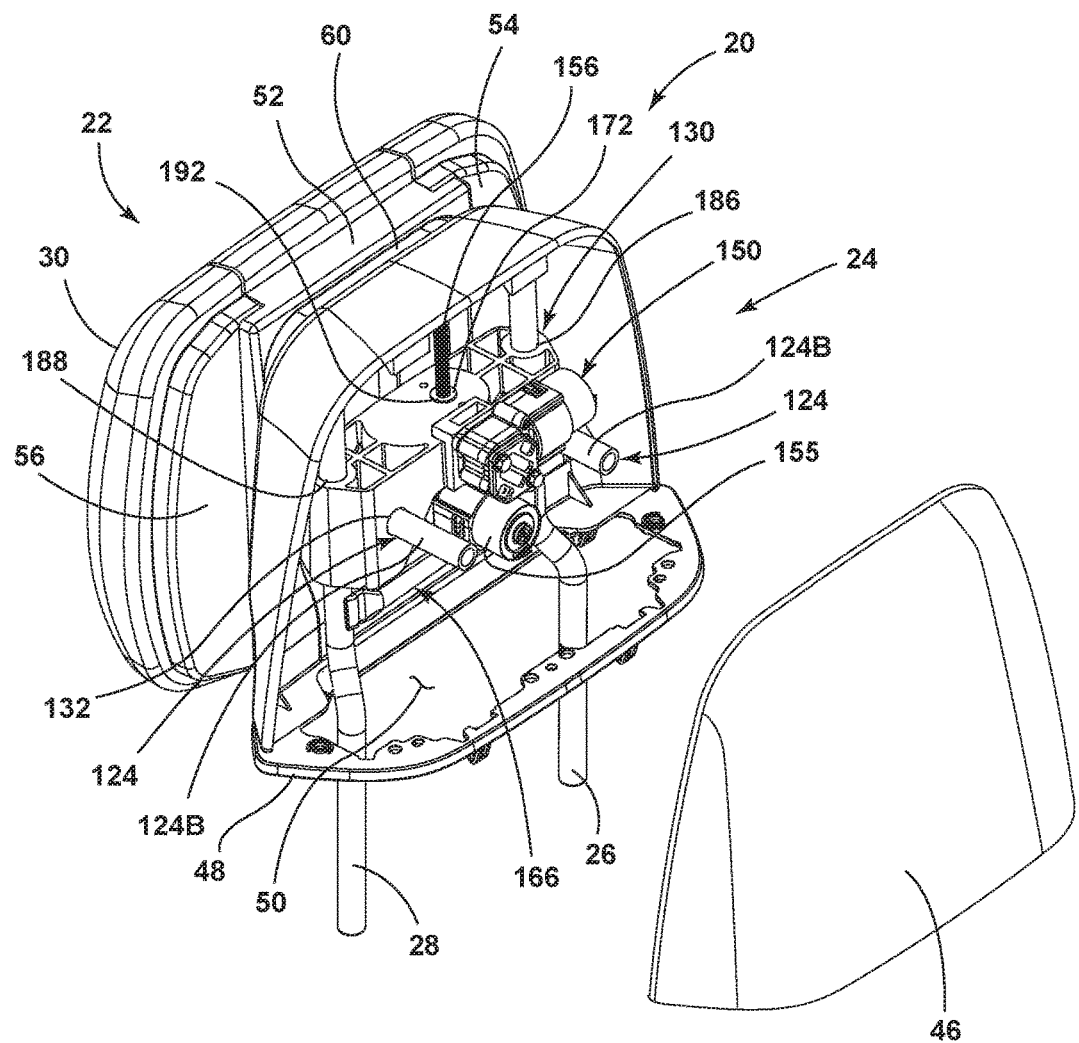
FIG. 15 is a top perspective view of the headrest assembly of FIG. 14 with a rear cover of a rear housing exploded away therefrom.

Referring now to FIGS. 14 and 15, the headrest assembly 20 is shown with the upright supports 26, 28 partially received within the interior cavity 50 of the rear housing 24. The support bar 166 is shown interconnecting the upright supports 26, 28 and the guide bracket 130 is also shown interconnecting the upright supports 26, 28 as received in the vertically disposed access channels 186, 188 of the guide bracket 130. With specific reference to FIG. 15, the rear cover 46 has been removed to show the motor 150 mounted to the guide bracket 130 for vertical movement therewith. Motor 155 is shown coupled to the support bar 166 in a fixed manner to drive the guide bracket 130 in the vertical direction using driveshaft 156. The body portions 124B of the guide members 124 are shown horizontally extending through the guide bracket 130 via horizontally disposed access channels 132 of the guide bracket 130.

Figure 16:
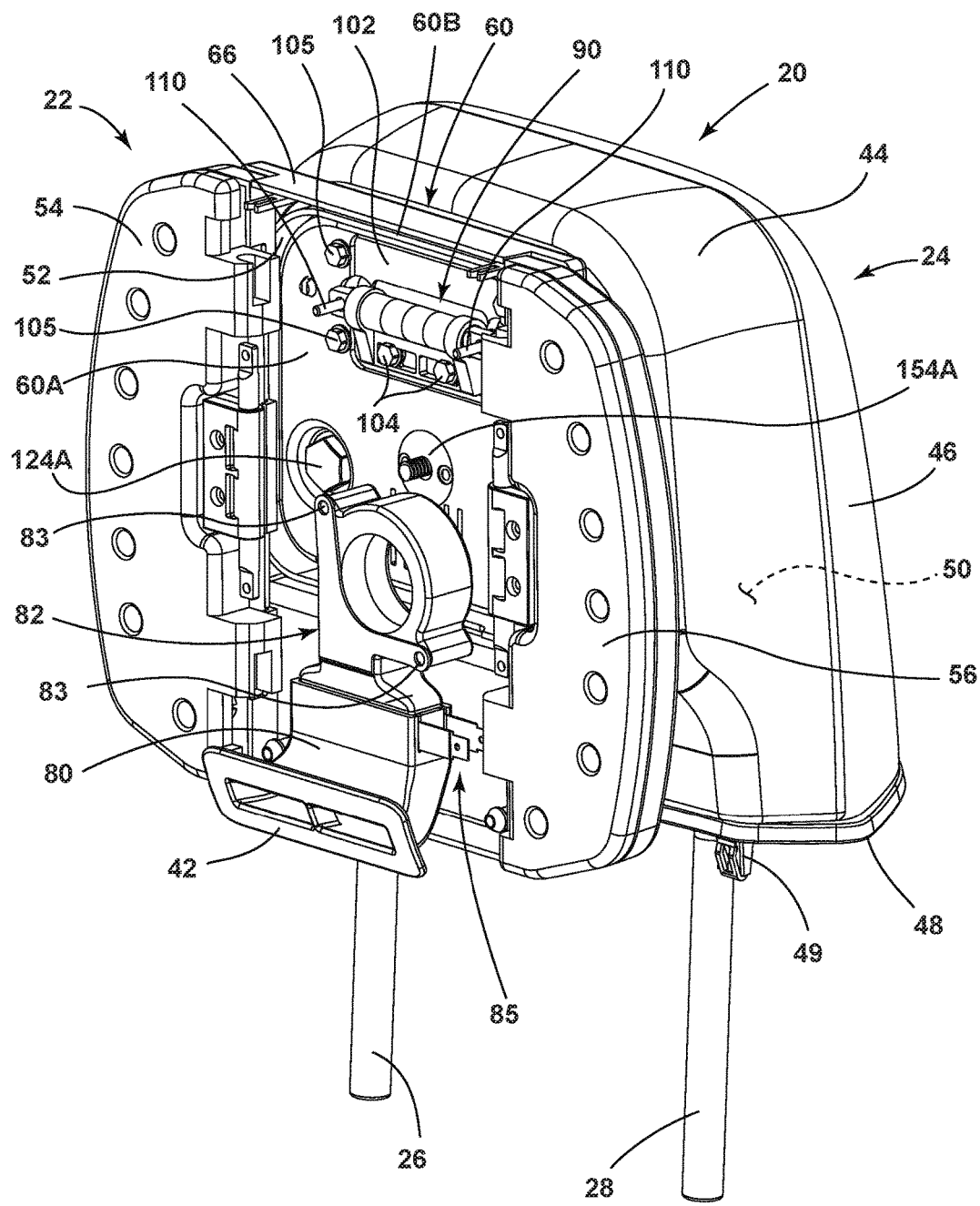
FIG. 16 is a front perspective view of the headrest assembly of FIG. 6 with a front panel of a central support member removed therefrom.

Referring now to FIG. 16, the headrest bun 22 is shown with the cushion portion 32 removed therefrom and the front panel 64 of the central support member 52 removed as well. With the front panel 64 of the central support member 52 removed, the air moving device 82 is shown. In assembly, the air moving device 82 is configured to be coupled to the front panel 64 of the central support member 52 via mounting apertures 83. The air moving device 82 further includes a plug assembly 85 that is configured to couple to a power system of a vehicle for powering the air moving device 82. As further shown in FIG. 16, the head portions 124A of the guide members 124 are shown coupled to the front cover 60A of the mounting plate 60. The hinge assembly 90 is shown mounted to the front cover 60A of the mounting plate 60 via fasteners 105 and further coupled to the mounting bracket 102 via fasteners 104. Fasteners 110 are shown outwardly extending from the hinge assembly 90 and are configured to couple to the front panel 64 of the central support member 52 (which has been removed from FIG. 16) for pivotally mounting the headrest bun 22 to the mounting plate 60.

Referring now to FIG. 17, the headrest bun 22 is shown in a raised position R relative to the rear housing 24. The rear housing 24 includes a lower portion 24A and an outer surface 24B, on which the vent cover 42 is disposed. Thus, in the configuration shown in FIG. 17, it is contemplated that an air moving device, such as air moving device 82 shown in FIG. 16, is disposed and mounted within the interior cavity 50 of the rear housing 24. In this way, an air moving device 82A of the headrest assembly 20 is a stationary air moving system that does not move with the headrest bun 22 during adjustment of the headrest bun 22, but rather remains fixed within the interior cavity 50 of the rear housing 24. The upright supports 26, 28 of the headrest assembly 20 are shown extending through an open bottom portion 51 of the rear housing 24 to access the interior cavity 50 of the rear housing 24. Power supplies for the motors 150, 155 and the air moving device 82A are contemplated to be received through the open bottom 51 of the rear housing 24 to interconnect the headrest assembly 20 with a power system of a vehicle, such as vehicle 12 shown in FIG. 1A. With the air moving device 82A being akin to the air moving device 82 shown in FIG. 16, it is contemplated that the air moving device 82A may include a heating element that is integrated in the air moving device 82A, such as heating element 84 shown in FIG. 8.

Figure 18:
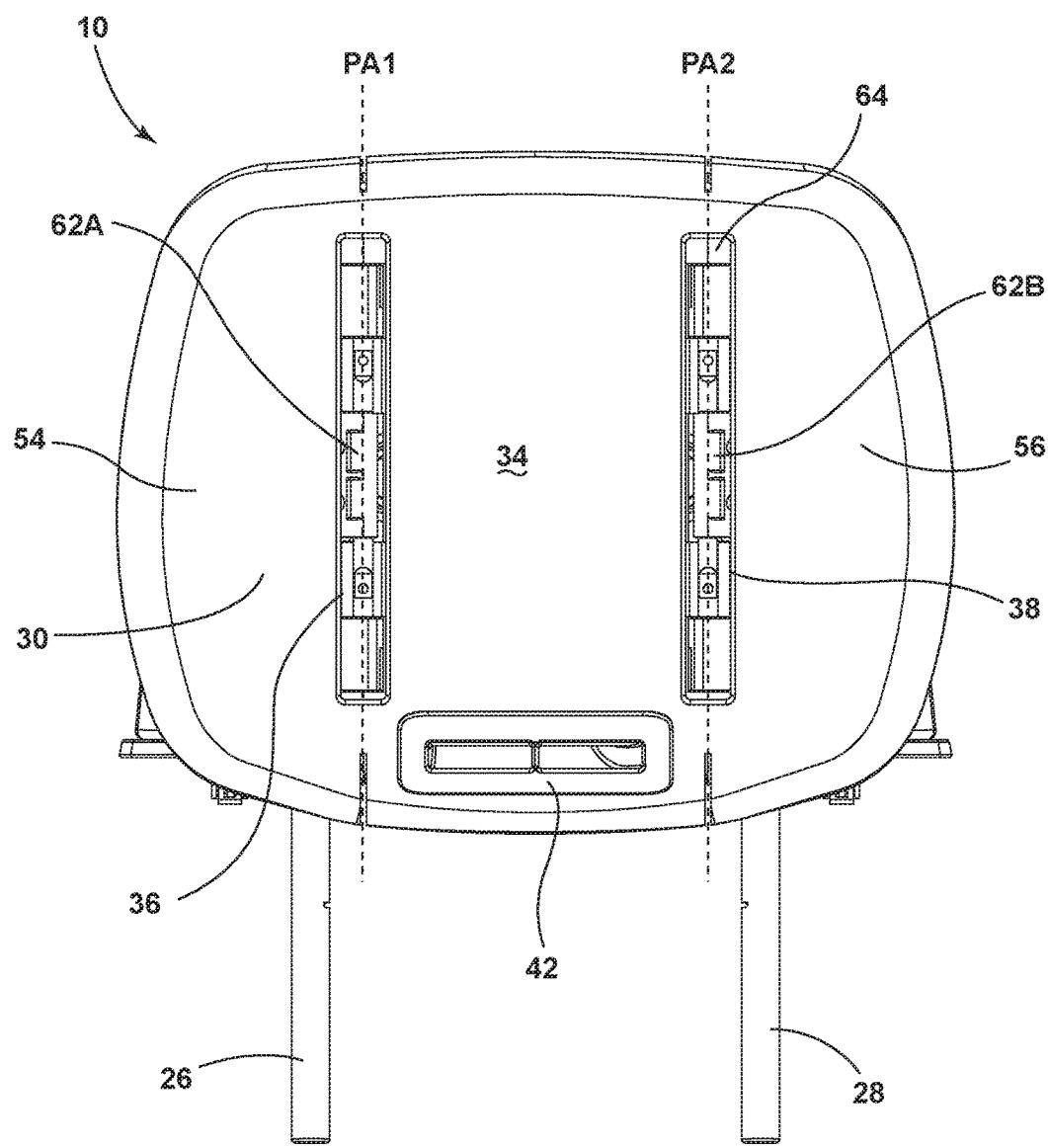
FIG. 18 is a front elevational view of the headrest assembly of FIG. 1B.

Referring now to FIG. 18, the headrest bun 22 is shown from a front elevation with the first and second side bolsters 54, 56 in the retracted position. As noted above, the first and second side bolsters 54, 56 are pivotally coupled to the front panel 64 of the central support member 52 via hinge assemblies 62A, 62B, respectively. In FIG. 18, the first and second side bolsters 54, 56 are shown in retracted positions to provide a generally flat front surface 34 for the headrest bun 22. As shown in FIG. 18, the headrest bun 22 includes elongate recesses 36, 38 which are disposed along the pivot axes PA1, PA2 of the first and second side bolsters 54, 56, respectively. As opposed to a continuous cushion material covering the headrest bun 22, the vertically disposed elongate recesses 36, 38 provide for increased flexibility of the headrest bun 22 at the first and second pivot axes PA1, PA2, thereby allow for articulation of the first and second side bolsters 54, 56 between the extended and retracted positions.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A headrest assembly, comprising:
   a stationary rear housing enclosing first and second motors;
   a mounting plate positioned outside of the stationary rear housing and operably coupled to the first and second motors for horizontal and vertical adjustment of the mounting plate;
   a headrest bun having a central support member pivotally coupled to the mounting plate between upright and angled positions;
   an air moving device disposed within the headrest bun and in communication with a vent cover disposed on an outer surface of the headrest bun; and
   first and second side bolsters pivotally coupled to opposite ends of the central support member, wherein the first and second side bolsters are independently operable between extended and retracted positions.

2. The headrest assembly of claim 1, including:
first and second elongate recesses disposed on an outer surface of the headrest bun and further disposed on pivot axes of the first and second side bolsters, respectively.

3. The headrest assembly of claim 1, including:
a heating element in thermal communication with the air moving device.

4. The headrest assembly of claim 1, including:
an air moving device disposed within the stationary rear housing and in communication with a vent cover disposed on an outer surface of the stationary rear housing.

5. The headrest assembly of claim 4, including:
a heating element integrated into the air moving device.

6. The headrest assembly of claim 1, wherein the headrest bun is pivotally coupled to the mounting plate by a friction hinge assembly.

7. The headrest assembly of claim 1, wherein the first and second side bolsters are pivotally coupled to the central support member by friction hinge assemblies.

8. A headrest assembly, comprising:
a headrest bun having adjustable first and second side bolsters disposed on opposite ends thereof;
a mounting plate pivotally supporting the headrest bun between upright and tilt positions;
first and second motors disposed in a rear housing and operably coupled to the mounting plate for driving horizontal and vertical movement of the headrest bun; and
an air moving device disposed within an interior of the headrest bun.

9. The headrest assembly of claim 8, including:
a vent cover disposed on an outer surface of the headrest bun.

10. The headrest assembly of claim 9, including:
a duct assembly interconnecting the vent cover with the air moving device.

11. The headrest assembly of claim 10, including:
a heating element in thermal communication with the air moving device.

12. The headrest assembly of claim 9, including:
first and second elongate recesses disposed on the outer surface of the headrest bun.

13. The headrest assembly of claim 8, including:
a central support member disposed on a rear side of the headrest bun.

14. The headrest assembly of claim 13, wherein the first and second side bolsters are pivotally coupled to the central support member.

15. The headrest assembly of claim 14, wherein the central support member includes first and second outwardly extending tabs which abut rear portions of the first and second side bolsters when the first and second side bolsters are in retracted positions.

16. The headrest assembly of claim 15, wherein the first and second side bolsters are pivotally coupled to the central support member by independently operable friction hinge assemblies.

17. A headrest assembly, comprising:
a rear housing;
a mounting plate operably coupled to the rear housing, wherein the mounting plate is vertically and horizontally adjustable relative to the rear housing; and
a headrest bun pivotally coupled to the mounting plate between upright and angled positions; and
an air moving device disposed within an interior of the headrest bun.

18. The headrest assembly of claim 17, wherein the headrest bun includes first and second side bolsters independently operable between extended and retracted positions.

19. The headrest assembly of claim 18, including:
first and second elongate recesses disposed on an outer surface of the headrest bun along pivot axes of the first and second side bolsters, respectively.

* * * * *